United States Patent
Levy et al.

(10) Patent No.: US 11,621,948 B2
(45) Date of Patent: Apr. 4, 2023

(54) DETECTING DIGITAL CERTIFICATE EXPIRATION THROUGH REQUEST PROCESSING

(71) Applicant: Amazon Technologies, Inc., Seattle, WA (US)

(72) Inventors: Marcel Andrew Levy, Seattle, WA (US); Peter Zachary Bowen, Bainbridge Island, WA (US); Jonathan Kozolchyk, Seattle, WA (US); Nicholas Wexler, Lynnwood, WA (US)

(73) Assignee: Amazon Technologies, Inc., Seattle, WA (US)

( * ) Notice: Subject to any disclaimer, the term of this patent is extended or adjusted under 35 U.S.C. 154(b) by 418 days.

(21) Appl. No.: 16/685,760

(22) Filed: Nov. 15, 2019

(65) Prior Publication Data
US 2020/0084195 A1    Mar. 12, 2020

Related U.S. Application Data

(63) Continuation of application No. 15/453,604, filed on Mar. 8, 2017, now Pat. No. 10,484,355.

(51) Int. Cl.
*H04L 9/32*    (2006.01)
*H04L 9/40*    (2022.01)
*H04L 9/30*    (2006.01)

(52) U.S. Cl.
CPC ............. *H04L 63/068* (2013.01); *H04L 9/30* (2013.01); *H04L 9/3268* (2013.01); *H04L 63/0823* (2013.01)

(58) Field of Classification Search
CPC ............... H04L 63/0823; H04L 63/068; H04L 9/3263; H04L 9/3268; H04L 9/088; H04L 9/0891; H04L 9/30
See application file for complete search history.

(56) References Cited

U.S. PATENT DOCUMENTS

| | | |
|---|---|---|
| 5,872,849 A | 2/1999 | Sudia |
| 6,754,661 B1 | 6/2004 | Hallin et al. |
| 7,549,043 B2 | 6/2009 | Adams et al. |
| 7,650,493 B2 | 1/2010 | Narin |
| 7,814,315 B2 | 10/2010 | Parkinson |
| 7,937,583 B2 | 5/2011 | Thornton et al. |
| 8,195,934 B1 | 6/2012 | Lawrence |
| 8,549,300 B1 | 10/2013 | Kumar et al. |

(Continued)

FOREIGN PATENT DOCUMENTS

WO    2016163979 A1    10/2016

OTHER PUBLICATIONS

Atkinson, R., "IP Authentication Header," Request for Comments: 1826, Standards Track, Aug. 1995, 14 pages.

(Continued)

*Primary Examiner* — Daniel B Potratz
(74) *Attorney, Agent, or Firm* — Davis Wright Tremaine LLP

(57) ABSTRACT

A computer system detects that a digital certificate is set to expire within a threshold amount of time. In response to detecting that the digital certificate is set to expire, the computer system generates an update to cause a second computer system to perform operations to indicate an upcoming expiration of the digital certificate. The computer system provides the update to the second computer system to cause the second computer system to perform the operations.

20 Claims, 8 Drawing Sheets

(56) References Cited

U.S. PATENT DOCUMENTS

| | | | |
|---|---|---|---|
| 8,949,597 | B1 | 2/2015 | Reeves et al. |
| 9,083,696 | B1 | 7/2015 | Khaitan |
| 9,100,190 | B1 | 8/2015 | Schwengler et al. |
| 9,215,075 | B1 | 12/2015 | Poltorak |
| 9,280,651 | B2* | 3/2016 | Dragomir ........... H04L 63/0823 |
| 9,461,828 | B2 | 10/2016 | Engberg et al. |
| 9,825,938 | B2 | 11/2017 | Koster |
| 9,882,727 | B1 | 1/2018 | Veladanda et al. |
| 10,210,510 | B1 | 2/2019 | Brandwine |
| 10,257,161 | B2 | 4/2019 | L. et al. |
| 10,439,826 | B2 | 10/2019 | Grajek et al. |
| 10,454,690 | B1 | 10/2019 | Popoveniuc et al. |
| 2002/0056747 | A1 | 5/2002 | Matsuyama et al. |
| 2002/0116647 | A1 | 8/2002 | Mont et al. |
| 2002/0184182 | A1 | 12/2002 | Kwan |
| 2002/0194010 | A1 | 12/2002 | Bergler et al. |
| 2002/0194471 | A1 | 12/2002 | Benantar et al. |
| 2003/0014629 | A1 | 1/2003 | Zuccherato |
| 2003/0084311 | A1 | 5/2003 | Merrien et al. |
| 2003/0126433 | A1 | 7/2003 | Hui |
| 2003/0200437 | A1 | 10/2003 | Oishi |
| 2004/0177246 | A1 | 9/2004 | Balaz et al. |
| 2005/0069136 | A1 | 3/2005 | Thornton et al. |
| 2005/0071630 | A1 | 3/2005 | Thornton et al. |
| 2005/0076203 | A1 | 4/2005 | Thornton et al. |
| 2005/0114653 | A1 | 5/2005 | Sudia |
| 2005/0289644 | A1 | 12/2005 | Wray |
| 2006/0218403 | A1* | 9/2006 | Sauve ................. H04L 63/0823 713/175 |
| 2006/0282664 | A1 | 12/2006 | Zhao |
| 2006/0294576 | A1 | 12/2006 | Cross et al. |
| 2008/0086633 | A1 | 4/2008 | Anderson et al. |
| 2008/0123855 | A1 | 5/2008 | Thomas |
| 2008/0253306 | A1 | 10/2008 | Manion et al. |
| 2008/0320569 | A1 | 12/2008 | Parkinson |
| 2009/0037894 | A1 | 2/2009 | Unger |
| 2009/0063855 | A1 | 3/2009 | Parkinson |
| 2009/0319783 | A1 | 12/2009 | Thornton et al. |
| 2009/0327708 | A1* | 12/2009 | Hazlewood ......... H04L 63/0823 713/158 |
| 2010/0146250 | A1 | 6/2010 | Bergerson et al. |
| 2010/0268942 | A1 | 10/2010 | Hernandez-Ardieta et al. |
| 2011/0004763 | A1 | 1/2011 | Sato et al. |
| 2011/0087882 | A1 | 4/2011 | Kuo et al. |
| 2011/0113238 | A1 | 5/2011 | Jennings et al. |
| 2011/0126003 | A1 | 5/2011 | Engert |
| 2011/0154017 | A1 | 6/2011 | Edstrom et al. |
| 2011/0154024 | A1 | 6/2011 | Ignaci et al. |
| 2011/0161663 | A1 | 6/2011 | Nakhjir |
| 2011/0202759 | A1 | 8/2011 | Hubbell et al. |
| 2011/0213963 | A1 | 9/2011 | Wnuk |
| 2012/0036558 | A1 | 2/2012 | Maheshwari et al. |
| 2012/0054487 | A1 | 3/2012 | Sun et al. |
| 2013/0254535 | A1 | 9/2013 | Akehurst et al. |
| 2013/0263211 | A1* | 10/2013 | Neuman ............. H04L 63/0876 726/1 |
| 2014/0095866 | A1 | 4/2014 | Grebennikov et al. |
| 2016/0057132 | A1* | 2/2016 | Gibson ............... H04L 63/0823 713/156 |
| 2016/0373263 | A1 | 12/2016 | Zaidi et al. |
| 2017/0026240 | A1 | 1/2017 | Purusothaman et al. |
| 2017/0033935 | A1 | 2/2017 | Clark et al. |
| 2017/0104749 | A1 | 4/2017 | Koster |
| 2017/0329614 | A1* | 11/2017 | Schon ................... G06F 3/0481 |
| 2018/0062855 | A1 | 3/2018 | Bracken et al. |
| 2018/0097803 | A1 | 4/2018 | Iwanir et al. |
| 2018/0109390 | A1 | 4/2018 | Spratte et al. |
| 2018/0123805 | A1 | 5/2018 | Veladanda et al. |
| 2018/0139214 | A1 | 5/2018 | Anderson et al. |

OTHER PUBLICATIONS

Atkinson, R., "IP Encapsulating Security Payload (ESP)," Request for Comments: 1827, Standards Track, Aug. 1995, 13 pages.

Atkinson, R., "Security Architecture for the Internet Protocol," Request for Comments: 1825, Standards Track, Aug. 1995, 23 pages.

Blake-Wilson et al., "Elliptic Curve Cryptography (ECC) Cipher Suites for Transport Layer Security (TLC)," Request for Comments: 4492, Informational, May 2006, 35 pages.

Blake-Wilson et al., "Transport Layer Security (TLS) Extensions," Request for Comments: 3546, Standards Track, Jun. 2003, 29 pages.

Blake-Wilson et al., "Transport Layer Security (TLS) Extensions," Request for Comments: 4366, Standards Track, Apr. 2006, 30 pages.

Blumenthal et al., "Pre-Shared Key (PSK) Ciphersuites with NULL Encryption for Transport Layer Security (TLS)," Request for Comments: 4785, Standards Track, Jan. 2007, 5 pages.

Brown et al., "Transport Layer Security (TLS) Authorization Extensions," Request for Comments: 5878, Experimental, May 2010, 19 pages.

Chown, "Advanced Encryption Standard (AES) Ciphersuites for Transport Layer Security (TLS)," Request for comments: 3268, Standards Track, Jun. 2002, 7 pages.

Cooper et al., "Internet X.509 Public Key Infrastructure Certificate and Certificate Revocation List (CRL) Profile," Request for Comments: 5280, May 2008, 141 pages.

Cooper et al., "Internet X.509 Public Key Infrastructure: Certification Path Building," Request for Comments: 4158, Sep. 2005, 81 pages.

Dierks et al., "The TLS Protocol Version 1.0," Request for Comments 2246, Jan. 1999, 75 pages.

Dierks et al., "The Transport Layer Security (TLS) Protocol Version 1.2," Request for Comments: 5246, Standards Track, Aug. 2008, 98 pages.

Eastlake, E., "Transport Layer Security (TLS) Extensions: Extension Definitions," Request for Comments: 6066, Standards Track, Jan. 2011, 25 pages.

Eronen et al., "Pre-Shared Key Ciphersuites for Transport Layer Security (TLS)," Request for Comments 4279, Dec. 2005, 16 pages.

Ford-Hutchinson, "Securing FTP with TLS," Request for Comments: 4217, Standards Track, Oct. 2005, 29 pages.

Friend, "Transport Layer Security (TLS) Protocol Compression Using Lempel-Ziv-Stac (LZS)," Request for Comments 3943, Informational, Nov. 2004, 13 pages.

Gutmann, "Encrypt-then-MAC for Transport Layer Security (TLS) and Datagram Transport Layer Security (DTLS)," Request for Comments: 7366, Standards Track, Sep. 2014, 7 pages.

Hoffman, "SMTP Service Extension for Secure SMTP over Transport Layer Security," Request for Comments: 3207, Standards Track, Feb. 2002, 9 pages.

Hollenbeck, "Transport Layer Security Protocol Compression Methods," Request for Comments: 3749, Standards Track, May 2004, 8 pages.

Housley, R., "Using Advanced Encryption Standard (AES) CCM Mode With IPsec Encapsulating Security Payload (ESP)," Request for Comments: 4309, Standards Track, Dec. 2005, 14 pages.

Kanno et al., "Addition of the Camellia Cipher Suites to Transport Layer Security (TLS)," Request for Comments: 6367, Informational, Sep. 2011, 8 pages.

Kam, P., et al., "The ESP DES-CBC Transform," Request for Comments: 1829, Standards Track, Aug. 1995, 11 pages.

Kato et al., "Camellia Cipher Suites for TLS," Request for Comments: 5932, Standards Track, Jun. 2010, 6 pages.

Kent, "Privacy Enhancement for Internet Electronic Mail: Part II: Certificate-Based Key Management," Request for Comments: 1422, Feb. 1993, 32 pages.

Kent, S., "IP Encapsulating Security Payload (ESP)," Request for Comments: 4303, Standards Track, Dec. 2005, 45 pages.

Kent, S., "Security Architecture for the Internet Protocol," Request for Comments: 2401, Standards Track, Nov. 1998, 32 pages.

Kent, S., and K. Seo, "Security Architecture for the Internet Protocol," Request for Comments: 4301, Standards Track, Dec. 2005, 102 pages.

Khare et al., "Upgrading to TLS within HTTP/1.1," Request for Comments: 2817, Standards Track, May 2000, 13 pages.

(56) References Cited

OTHER PUBLICATIONS

Kim et al., "Addition of the ARIA Cipher Suites to Transport Layer Security (TLS)," Request for Comments: 6209, Informational, Apr. 2011, 9 pages.
Lee et al., "Addition of SEED Cipher Suites to Transport Layer Security (TLS)," Request for Comments: 4162, Standards Track, Aug. 2005, 6 pages.
Mavrogiannopoulos et al., "Using OpenPGP Keys for Transport Layer Security (TLS) Authentication," Request for Comments: 6091, Informational, Feb. 2011, 9 pages.
Mavrogiannopoulos, "Using OpenPGP Keys for Transport Layer Security (TLS) Authentication," Request for Comments: 5081, Experimental, Nov. 2007, 8 pages.
McGrew et al., "AES-CCM Cipher Suites for Transport Layer Security (TLS)," Request for Comments: 6655, Standards Track, Jul. 2012, 8 pages.
McGrew et al., "Datagram Transport Layer Security (DTLS) Extension to Establish Keys for the Secure Real-time Transport Protocol (SRTP)," Request for Comments 5764, May 2010, 27 pages.
Medvinsky et al., "Addition of Kerberos Cipher Suites to Transport Layer Security (TLS)," Request for Comments: 2712, Standards Track, Oct. 1999, 7 pages.
Merkle et al., "Elliptic Curve Cryptography (ECC) Brainpool Curves for Transport Layer Security (TLS)," Request for Comments: 7027, Informational, Oct. 2013, 10 pages.
Metzger, P., et al., "IP Authentication Using Keyed MD5," Request for Comments: 1828, Standards Track, Aug. 1995, 6 pages.
Moriai et al., "Addition of Camellia Cipher Suites to Transport Layer Security (TLS)," Request for Comments: 4132, Standards Track, Jul. 2005, 7 pages.
Newman, "Using TLS with IMAP, POP3 and ACAP," Request for Comments: 2595, Standards Track, Jun. 1999, 15 pages.
Orman, H., "The OAKLEY Key Determination Protocol," Request for Comments: 2412, Informational, Nov. 1998, 56 pages.
Phelan, "Datagram Transport Layer Security (DTLS) over the Datagram Congestion Control Protocol (DCCP)," Request for Comments 5238, May 2008, 11 pages.
Rescorla et al., "Datagram Transport Layer Security Version 1.2," Request for Comments 6347, Jan. 2012, 33 pages.
Rescorla et al., "Datagram Transport Layer Security," Request for Comments: 4347, Standards Track, Apr. 2006, 25 pages.
Rescorla et al., "Transport Layer Security (TLS) Renegotiation Indication Extension," Request for Comments: 5746, Standards Track, Feb. 2010, 15 pages.
Rescorla, "HTTP Over TLS," Request for Comments: 2818, Informational, May 2000, 7 pages.
Rescorla, "TLS Elliptic Curve Cipher Suites with SHA-256/384 and AES Galois Counter Mode (GCM)," Request for Comments: 5289, Informational, Aug. 2008, 6 pages.
Salowey et al., "Transport Layer Security (TLS) Session Resumption without Server-Side State," Request for Comments: 5077, Standards Track, Jan. 2008, 20 pages.
Salowey, "AES Galois Counter Mode (GCM) Cipher Suites for TLS," Request for Comments: 5288, Standards Track, Aug. 2008, 8 pages.
Salter et al., "Suite B Profile for Transport Layer Security (TLS)," Request for Comments: 6460, Informational, Jan. 2012, 14 pages.
Rojanapasakorn et al., "A performance study of over-issuing delta-CRLs with distribution points," 18th International Conference on Advanced Information Networking and Applications, Mar. 29, 2004, 4 pages.
Santesson et al., "TLS User Mapping Extension," Request for Comments: 4681, Standards Track, Oct. 2006, 11 pages.
Santesson, "TLS Handshake Message for Supplemental Data," Request for Comments: 4680, Standards Track, Sep. 2006, 9 pages.
Taylor et al., "Using the Secure Remote Password (SRP) Protocol for TLS Authentication," Request for Comments: 5054, Informational, Nov. 2007, 24 pages.

Tuexen et al., "Datagram Transport Layer Security (DTLS) for Stream Control Transmission Protocol (SCTP)," Request for Comments 6083, Jan. 2011, 10 pages.
Turner et al., "Prohibiting Secure Sockets Layer (SSL) Version 2.0," Request for Comments 6176, Mar. 2011, 4 pages.
Wikipedia, "Favicon," Wikipedia the Free Encyclopedia, last edited on Jun. 24, 2017, https://en.wikipedia.org/wiki/Favicon, 5 pages.
Zheng, "Tradeoffs in Certificate Revocation Schemes," ACM SIGCOMM Computer Communication Review 33 (2):103-112, Apr. 2003.
Atkinson, "IP Authentication Header," Request for Comments: 1826, Standards Track, Aug. 1995, 14 pages.
Karn et al., "The ESP DES-CBC Transform," Request for Comments: 1829, Standards Track, Aug. 1995, 11 pages.
Metzger et al., "IP Authentication Using Keyed MD5," Request for Comments: 1828, Standards Track, Aug. 1995, 6 pages.
Orman, "The OAKLEY Key Determination Protocol," Request for Comments: 2412, Informational, Nov. 1998, 56 pages.
Chinese Office Action dated Jun. 1, 2020, Patent Application No. 201880016462.9, 5 pages.
European Communication pursuant to Article 94(3) EPC dated Oct. 30, 2020, Patent Application No. 18714103.1, 5 pages.
Chinese Notification of Intention to Grant Invention Patent Right dated Jan. 13, 2021, Patent Application No. 201880016462.9, 2 pages.
European Communication pursuant to Article 94(3) EPC dated Aug. 2, 2021, Patent Application No. 18714103.1, 4 pages.
Wikipedia, "Online Certificate Status Protocol," Wikipedia the Free Encylodia, last edited on May 24, 2017, https://en.wikipedia org/wiki/Online_Certificate_Status_Protocol, 5 pages.
International Search Report and Written Opinion dated May 17, 2018, International Patent Application No. PCT/US2018/021119, filed Mar. 6, 2018, 15 pages.
Azer et al., "Certification and Revocation Schemes in Ad Hoc Networks Survey and Challenges," 2007 Second International Conference on Systems and Networks Communications (ICSNC 2007), Aug. 25, 2007, 6 pages.
Blake-Wilson et al., "Elliptic Curve Cryptography (ECC) Cipher Suites for Transport Layer Security (TLS)," Request for Comments: 4492, Informational, May 2006, 35 pages.
Chen et al., "The improved research on property-based remote attestation," 2010 International Conference on Computer Application and System Modeling (ICCASM 2010), Oct. 22, 2010, 5 pages.
Choi et al., "A new on-line certificate validation method using LDAP component matching technology," Proceedings from the Sixth Annual IEEE SMC Information Assurance Workshop, Jun. 15, 2005, 6 pages.
Duan et al., "Flexible Certificate Revocation List for Efficient Authentication in IoT," Proceedings of the 8th International Conference on the Internet of Things, Oct. 15, 2018, 8 pages.
Eastlake, "Transport Layer Security (TLS) Extensions: Extension Definitions," Request for Comments: 6066, Standards Track, Jan. 2011, 25 pages.
Kanno et al., "Addition of the Camellia Cipher Suites to Transport Layer Security (TLS)," Request for Comments: 3367, Informational, Sep. 2011, 8 pages.
Kent et al., "Security Architecture for the Internet Protocol," Request for Comments: 2401, Standards Track, Nov. 1998, 62 pages.
Kouril et al. , "A Robust and Efficient Mechanism to Distribute Certificate Revocation Information Using the Grid Monitoring Architecture," 21st International Conference on Advanced Information Networking and Applications Workshops (AINAW'07), May 21, 2007, 6 pages.
Levy et al., "Detecting Digital Certificate Expiration Through Request Processing," U.S. Appl. No. 15/453,604, filed Mar. 8, 2017.
Levy et al., "Digital Certificate Issuance and Monitoring," U.S. Appl. No. 15/453,562, filed Mar. 8, 2017.
Levy et al., "Digital Certificate Usage Monitoring Systems," U.S. Appl. No. 15/453,587, filed Mar. 8, 2017.

(56) References Cited

OTHER PUBLICATIONS

Liu et al., "An end-to-end measurement of certificate revocation in the web's PKI," Proceedings of the 2015 Internet Measurement Conference, Oct. 28, 2015, 14 pages.

* cited by examiner

DETECTING DIGITAL CERTIFICATE EXPIRATION THROUGH REQUEST PROCESSING

CROSS-REFERENCE TO RELATED APPLICATION

This application is a continuation of U.S. patent application Ser. No. 15/453,604, filed Mar. 8, 2017, the disclosure of which is incorporated herein by reference in its entirety.

BACKGROUND

Digital certificates, issued by a trusted certificate authority, are often used to enable the exchange of data securely over a communications network. For instance, a digital certificate may include a computing service's public cryptographic key, which can be used by recipients to authenticate the computing service and to decrypt any encrypted information provided by the computing service to the recipients. The digital certificate may be signed by a certificate authority that the computing service and the recipients of the digital certificate trust. However, digital certificates can be cumbersome to manage, especially in systems that utilize multiple servers. For example, digital certificates typically have limited lifetimes. Ensuring that digital certificates are timely replaced is often a tedious manual process that often goes forgotten. Use of an expired digital certificate can cause problems, such as a lack of trust by a computer system to which an expired digital certificate is presented. With a lack of trust, functionality may become limited to prevent security issues.

BRIEF DESCRIPTION OF THE DRAWINGS

Various techniques will be described with reference to the drawings, in which.

DETAILED DESCRIPTION

Figure 1:
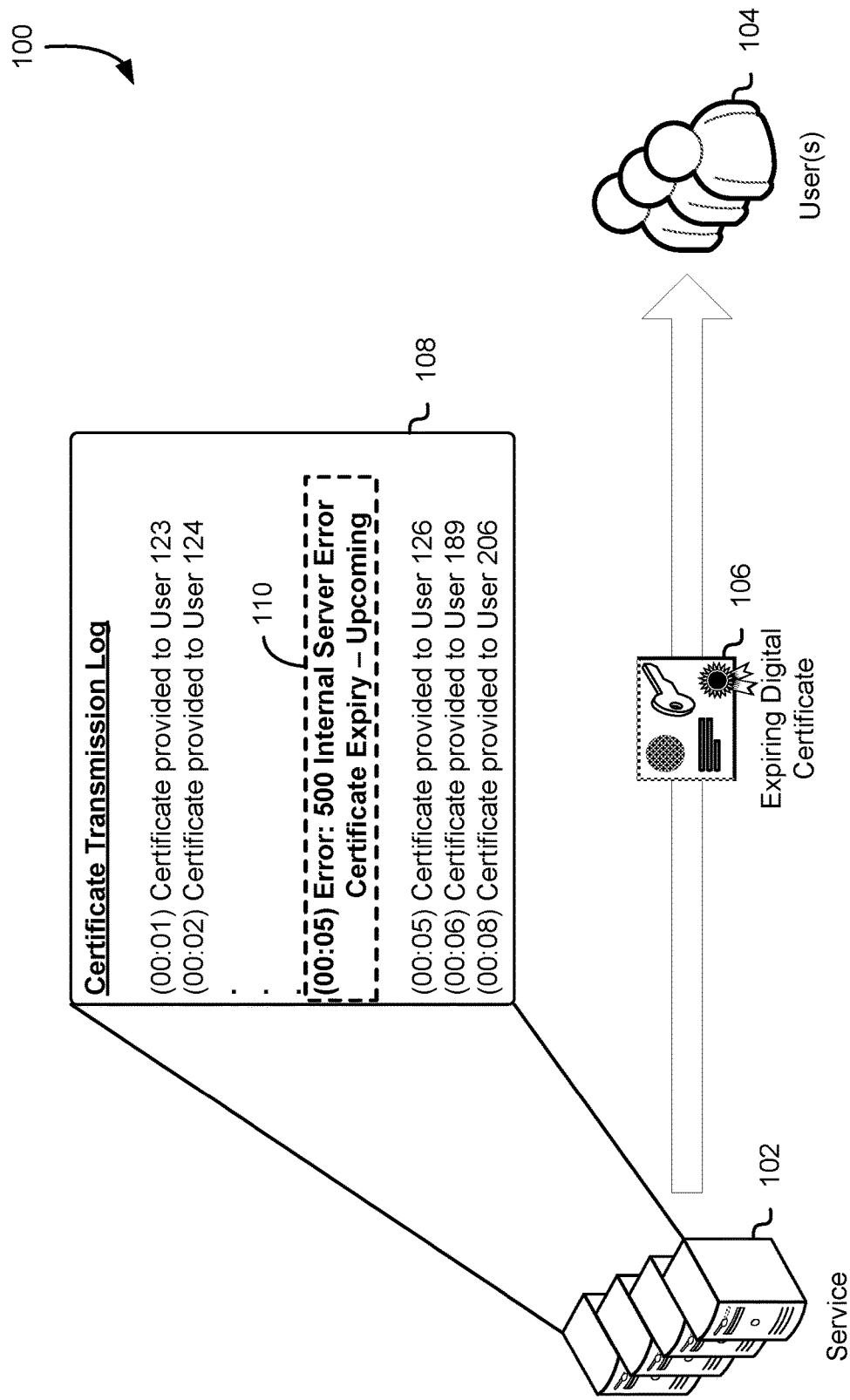
FIG. 1 shows an illustrative example of an environment in which request logs of a computing service are updated to include one or more HyperText Transfer Protocol (HTTP) status codes indicating that a digital certificate is set to expire in accordance with at least one embodiment.

This patent disclosure relates to the monitoring of digital certificates to detect any expiring digital certificates provided by a computing service to various clients. In an example, as a computing service initiates a compute instance for processing client requests, the computing service, via an agent, installs a digital certificate provided by a certificate authority that can be provided to clients submitting requests to the computing service for authentication purposes. For instance, the computing service may provide a digital certificate to a client to enable the client to verify that the digital certificate was issued to the computing service by a certificate authority that the client trusts, thereby authenticating the computing service. In an example, the agent evaluates configuration information for the monitoring of the digital certificate to determine whether the digital certificate is set to expire to perform certain operations if the digital certificate is set to expire. Based on the configuration information provided, the agent or other component of the computing service may monitor the digital certificate to determine if the digital certificate is set to expire.

The agent may evaluate the digital certificate over the validity period of the digital certificate to determine whether it is about to expire. For instance, the agent may determine that a digital certificate is expiring if the expiration date of the digital certificate is within a period of time from the current time. Based on the configuration information provided, the agent may perform certain operations to artificially indicate a degradation of a server that provides the digital certificate, which may serve as an indication that the digital certificate is expiring. For instance, in an example, the agent may determine whether there are any existing request logs maintained by the computing service. These request logs may include information regarding requests received by the computing service by various clients and may also specify whether a digital certificate was provided to the various clients in response to the requests. If the agent determines that these request logs are available, the agent may access the request logs and insert a status code that indicates that a digital certificate is set to expire. For instance, the agent may introduce various HTTP error codes into the request logs to indicate that the digital certificate is expiring. These HTTP error codes may be accompanied by explanatory text describing when the digital certificate is set to expire and actions that may be taken by the computing service to obtain a new digital certificate.

In another example, if the agent determines that the digital certificate is set to expire, the agent updates a configuration value for the impacted server of the computing service to cause the server to randomly increase the latency in providing the digital certificate in response to client requests. For instance, each server of the computing service may include an installation of a digital certificate that can be used to authenticate the computing service. If a digital certificate is set to expire, the agent may access a configuration file of the server to cause the server to randomly increase the latency in providing the digital certificate to a client. This may include installing a random number generator onto the server, which the server may use to generate a random number and, based on the number generated, determine whether to increase the latency in response to the client request. As the latency in providing the digital certificate to clients may be recorded in the request logs, the request logs may indicate additional latency in random requests. This may cause the computing service to detect that there is an issue in providing the digital certificate to the clients without unduly affecting performance overall and serves as an indication that the digital certificate is set to expire within a period of time.

In other examples, if the agent determines that the digital certificate is set to expire, the agent performs an update to the server of the computing service to cause the server to provide data to a client to generate a favicon that serves as an indication that the digital certificate is set to expire. For instance, a server may provide data to a client to cause the client to render a web page for display to a user of the client. An element of this data may include one or more image files corresponding to a favicon to be displayed to the user of the client. If the digital certificate is set to expire, the agent may replace the image files corresponding to the favicon with an alternative set of image files that may be used to render a different favicon that the user may recognize as being different from the standard favicon displayed. This may cause the user to transmit a notification to the computing service to indicate an issue with the favicon. The computing service may use this notification to determine that the digital certificate is set to expire. In some examples, the agent may cause the server to provide the alternative image files to administrators submitting requests to the computing service to test the server. For instance, the server may recognize that a request may be originating from a network address corresponding to an administrator of the computing service and provide the alternative image files in response to the request from the administrator along with the digital certificate. Thus, the administrator may view the alternative favicon and determine that the digital certificate is set to expire.

In this manner, an agent of the computing service may monitor the digital certificates provided by the computing service to determine whether any of these digital certificates are expiring and, if so, cause the computing service to perform operations to serve as an indication to the computing service or to an administrator that a digital certificate is set to expire. In addition, the techniques described and suggested in this disclosure enable additional technical advantages. For instance, because the agent causes the computing service to perform operations that either randomly increase the latency in providing the digital certificates to clients in response to their requests or cause a cosmetic change to the information provided to the clients and presented in the request logs, clients may access the computing service with minimal impact.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which request logs of a computing service are updated to include one or more HTTP status codes indicating that a digital certificate 106 is set to expire in accordance with at least one embodiment. In the environment 100, a user 104, via a user client or other computing device, may transmit a request to a computing service 102 to establish a communications channel between the user client and the computing service 102. The user 104, via the user client or other computing device, may submit an application layer (e.g., HTTP Secure (HTTPS), file transfer protocol, etc.) request to a destination server of the computing service 102 (e.g., network server) to establish a secure network communications channel, such as a Transport Layer Security/Secure Sockets Layer (TLS/SSL) secure channel. Generally, embodiments of the present disclosure may use various protocols, such as a SSL or TLS protocol and extensions thereto, such as defined in Request for Comments (RFC) 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6083, RFC 6066, RFC 6091, RFC 6176, RFC 6209, RFC 6347, RFC 6367, RFC 6460, RFC 6655, RFC 7027, and RFC 7366 which are incorporated herein by reference, to establish encrypted communications sessions. Other protocols implemented below the application layer of the Open Systems Interconnect (OSI) model may also be used and/or adapted to utilize techniques described herein. It should be noted that the techniques described herein are adaptable to other protocols such as the Real Time Messaging Protocol (RTMP), the Point-to-Point Tunneling Protocol (PPTP), the Layer 2 Tunneling Protocol, various virtual private network (VPN) protocols, Internet Protocol Security (e.g., as defined in RFC 1825 through 1829, RFC 2401, RFC 2412, RFC 4301, RFC 4309, and RFC 4303) and other protocols, such as protocols for secure communication that include a handshake.

The client device utilized by a user 104 may be a computer system that may include one or more applications installed on the computer system configured to access and communicate with a service made available through a destination server of the computing service 102. The client device may communicate with the computing service 102 through one or more communications networks, such as the Internet.

The computing service 102 may operate one or more web servers configured to provide web pages viewable through a browser application. Alternatively, the servers may be file servers that may be configured to enable clients to access one or more files remotely through the secure communications channel. Generally, these servers may include any server configured to establish a secure communications channel and implement various techniques described herein. In an embodiment, the computing service 102 presents, to the client device of a user 104 submitting a request to establish a secure communications channel or to otherwise access the computing service 102, a digital certificate 106 issued by a certificate authority trusted by the computing service 102 and the client device. The digital certificate 106 may be installed on to one or more servers of the computing service 102 by a certificate installation agent, which may submit a digital certificate signing request to a certificate authority to obtain the digital certificate 106 and may configure the one or more servers to provide the digital certificate 106 in response to requests from client devices. The digital certificate 106 may be an X.509 certificate, although other digital certificate encodings are also considered as being within the scope of the present disclosure. The digital certificate 106 may include various fields such as a version field, a serial number field, an algorithm identifier field, an issuer field, fields for validity periods, a subject field, fields about the public cryptographic key, issuer unique identifier fields, subject unique identifier fields, extension fields, certificate signature algorithm fields, and a certificate signature field. X.509 certificates are described in RFC 4158, RFC 5280, and RFC 1422, which are incorporated by reference.

In an embodiment, the certificate installation agent of the computing service 102 monitors usage of the digital certificate 106 according to configuration information provided by an administrator of the computing service 102 to determine whether the digital certificate 106 is set to expire. For instance, the certificate installation agent may evaluate the digital certificate 106 provided by the computing service 102 to identify the expiration date of the digital certificate 106 and to determine whether this expiration date is within a pre-defined time range identified in the configuration information. If the expiration date is within this pre-defined time range, the certificate installation agent may refer to the configuration information to determine what operations are to be performed to inform administrators of the computing service 102 of the impending expiration of the digital certificate 106. The certificate installation agent may include one or more computer systems of the computing service 102, one or more applications installed on a computer system of the computing service 102, or a module of a computer system of the computing service 102 that submits digital certificate signing requests to the certificate authority to obtain a digital certificate and installs the digital certificate 106 onto one or more servers of the computing service 102 to make the digital certificate 106 available to users 104.

The certificate installation agent may evaluate the digital certificate 106 to periodically determine whether it is expiring or in response to a triggering event. For instance, the certificate installation agent may evaluate a digital certificate 106 at regular time intervals (e.g., every minute, every hour, every day, etc.) to determine whether the digital certificate 106 is set to expire. Alternatively, the certificate installation agent may evaluate the digital certificate 106 upon request from an administrator of the computing service 102. If the certificate installation agent determines that the digital certificate 106 is set to expire within a period of time defined in the configuration information, the certificate installation agent may perform one or more operations to indicate that the digital certificate 106 is expiring.

In an embodiment, the certificate installation agent obtains, in response to determining that the digital certificate 106 is set to expire, one or more request logs 108 corresponding to user requests to access the computing service 102 and obtain the digital certificate 106. The one or more request logs 108 may include entries corresponding to user requests to access the computing service 102, transmission of the digital certificate 106 to the client devices of the users 104, and to other operations performed by the users 104 or the computing service 102 with regard to user requests. The certificate installation agent may modify the request logs 108 to include one or more HTTP entries 110 that may be used to specify that the digital certificate 106 is set to expire. For instance, the certificate installation agent may modify a request log 108 to include an HTTP error code, such as an HTTP 500 error code corresponding to an internal server error. In addition to the HTTP error code, the certificate installation agent may specify, in the HTTP entry 110, the certificate installation agent may specify the expiration date of the digital certificate 106, as well as other information that an administrator of the computing service 102 may utilize to determine when the digital certificate 106 is to expire and actions that may be taken to obtain a new digital certificate or to renew the existing digital certificate. It should be noted that while HTTP error codes are used extensively throughout the present disclosure for the purpose of illustration, other codes or entries may be included in the one or more request logs 108. For instance, instead of an HTTP error code, the certificate installation agent may generate one or more entries in a request log that indicates that the digital certificate 106 is to expire, as well as operations that may be performed to mitigate the impact of the expiring digital certificate. The one or more entries 110 added to the request logs 108 may also be formatted in a matter that may make the one or more entries 110 more noticeable. For instance, the certificate installation agent may change the font of the one or more entries 110 to be distinct from other entries in the request logs 108. Additionally, or alternatively, the certificate installation agent may change the color of the text included in the one or more entries 110.

In an alternative embodiment, the certificate installation agent modifies the one or more request logs 108 corresponding to user requests to access the computing service 102 and obtain the digital certificate 106 to specify that the digital certificate 106 has expired. This may cause an alarming system of the computing service 102 to generate an alarm indicating an urgent need to update the digital certificate 106. An administrator or other entity authorized to monitor performance of the computing service 102 may process the alarm and request issuance of a new digital certificate or renewal of the expiring digital certificate.

The certificate installation agent may store the modified request logs in a request log data store of the computing service 102 to make the modified request logs available to administrators and alarming systems of the computing service 102. As the expiration date of the digital certificate 106 gets closer, the certificate installation agent may include additional entries in the request logs to further highlight the impending expiration of the digital certificate 106. This may include making the entries more noticeable in the request logs 108 through various methods. These methods may include increasing the font size of entries denoting upcoming expiration of the digital certificate 106, applying a bold font face to the entries 110, increasing the number of entries corresponding to the upcoming expiration of the digital certificate 106, and the like.

In an alternative embodiment, the certificate installation agent generates one or more new requests logs that are specific to the upcoming expiration of the digital certificate 106. These new request logs may include entries regarding the upcoming expiration of the digital certificate 106 while omitting any other information regarding user requests to access the computing service 102. Thus, an administrator of the computing service 102 or an alarming system of the computing service 102 may evaluate these new request logs to determine that the digital certificate 106 is set to expire and to accordingly perform one or more remedial tasks, including obtaining a new digital certificate that can be installed on to the one or more servers of the computing service 102. The new request logs generated by the certificate installation agent may be stored in the request log data store described above.

Figure 2:
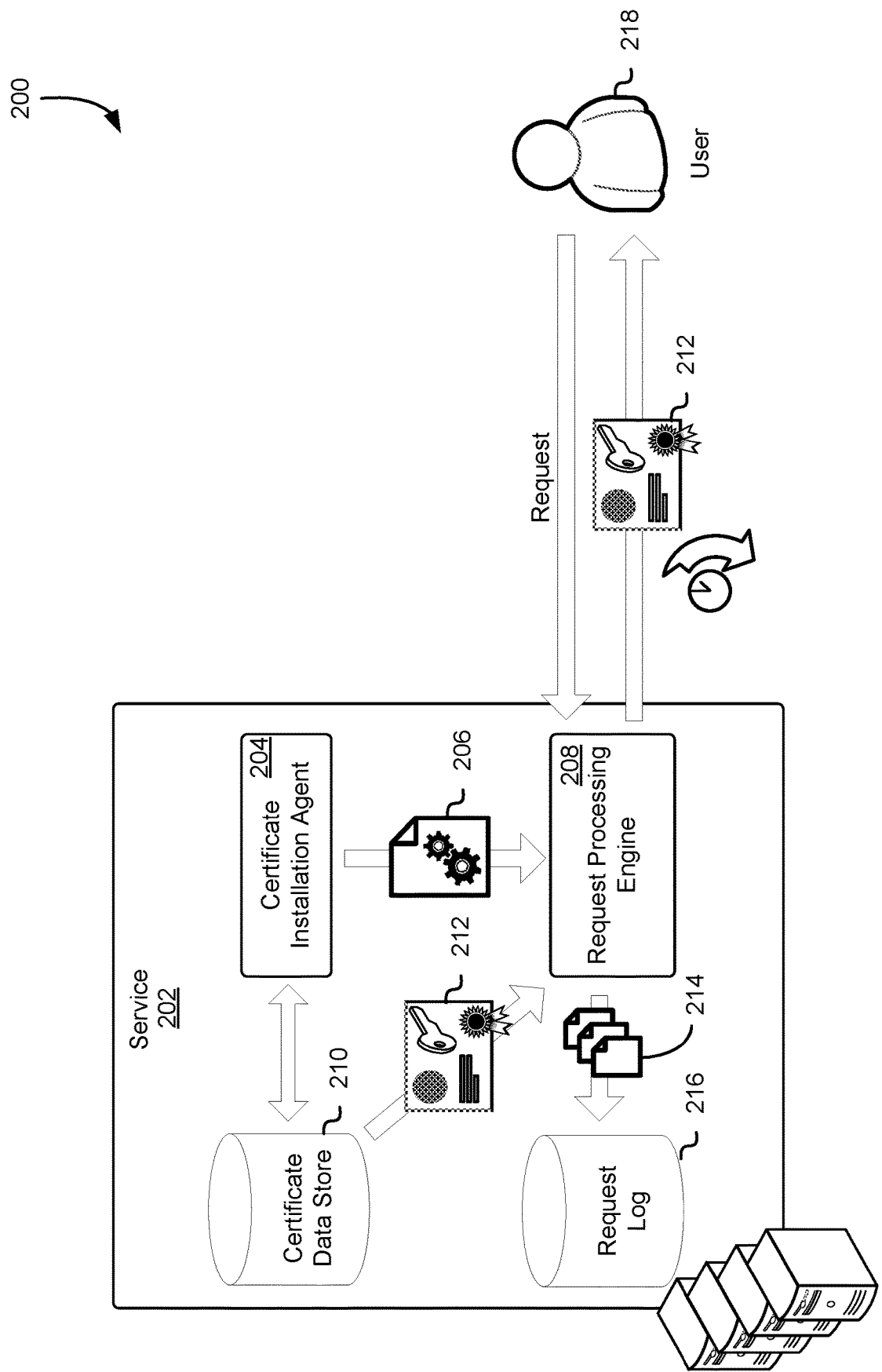
FIG. 2 shows an illustrative example of an environment in which a certificate installation agent of a computing service causes a request processing engine to increase the latency in providing a digital certificate to clients in accordance with at least one embodiment.

In addition or as an alternative to creating new request logs or appending existing request logs to indicate that a digital certificate is set to expire, a certificate installation agent may cause a request processing engine of the computing service to increase the latency in providing the digital certificate to users that have requested access to the computing service or to obtain the digital certificate to authenticate the computing service. Accordingly, FIG. 2 shows an illustrative example of an environment 200 in which a certificate installation agent 204 of a computing service 202 causes a request processing engine 208 to increase the latency in providing a digital certificate 212 to clients in accordance with at least one embodiment. In the environment 200, a user 218 of the computing service 202, via a client device, may submit a request to the computing service 202 to access resources provided by the computing service 202. This may include obtaining data from the computing service 202 that can be used to render a web page on the client device that the user 218 may interact with to utilize the resources of the computing service 202.

The request from the user 218 may be received by a request processing engine 208 of the computing service 202. The request processing engine 208 may include one or more computer systems of the computing service 202 that may determine whether the request can be authenticated and whether the user 218 is authorized to perform the requested action. For instance, the request processing engine 208 may provide the credential information to an authentication service for verification. The authentication service may evaluate the provided credential information to determine if the user 218 can be authenticated. If the user 218 cannot be authenticated, the authentication service may transmit a notification to the request processing engine 208 indicating that the user 218 could not be authenticated. This may cause the request processing engine 208 to deny the request. If the user 218 is successfully authenticated, the request processing engine 208 may obtain, from a certificate data store 210 of the computing service 202, a digital certificate 212 that can be provided to the user 218. This digital certificate 212 may be used by the user 218 to authenticate the computing service 202 and to decrypt any data provided by the request processing engine 208 that is encrypted by the computing service 202.

In an embodiment, the certificate installation agent 204 monitors the digital certificate 212 according to configuration information provided by an administrator of the computing service 202 or by a computing service provider. As described above, the configuration information may specify one or more operations to be performed if the certificate installation agent 204 detects that the digital certificate 212 is set to expire. Additionally, the configuration information may define a time range during which the operations specified in the configuration information may be performed. For instance, the operations may be performed if the time at which the digital certificate 212 is evaluated is within a time range leading to expiration of the digital certificate 212. In some embodiments, the time range is defined based at least in part on the frequency at which the digital certificate 212 is provided to users 218 of the computing service 202. For instance, if the digital certificate 212 is provided at a high frequency, the time range may be longer such that the operations are performed earlier and, accordingly, an administrator or other entity tasked with monitoring the computing service 202 may determine at an earlier time prior to expiration that the digital certificate 212 is set to expire. Similarly, if the digital certificate 212 is provided at a low frequency, the time range may be longer such that opportunities to cause opportunities to detect the upcoming expiration of the digital certificate 212 to not be missed. Other frequencies may cause the time range to be shorter.

The certificate installation agent 204 may provide the configuration information 206 to the request processing engine 208 to enable the request processing engine 208 to perform the operations specified in the configuration information 206. In an embodiment, the one or more operations specified in the configuration information 206 specify that in response to requests from users 218 of the computing service 202, the latency in providing the digital certificate 212 to the users 218 is to be increased by an amount that may have minimal impact to the users 218 of the computing service 202. For instance, the configuration information 206 may cause the request processing engine 208 to increase the latency in providing the digital certificate 212 in response to every nth request received by the request processing engine 208, where n is a value specified in the configuration information 206. Alternatively, the configuration information 206 may specify that latency is to be added to requests from users 218 randomly. This may cause the request processing engine 208 to utilize a random number generator to generate a random number. If the random number falls within a range of numbers corresponding to the increase of latency for requests, the request processing engine 208 may increase the latency for responding to a request from a user 218. In some instances, the configuration information 206 may cause the request processing engine 208 to configure a hypervisor for the computing service 202 to scan communications for the digital certificate 212 and, if a communication for the digital certificate 212 is detected, hold the digital certificate 212 in a buffer for a period of time corresponding to the latency specified in the configuration information 206.

In some embodiments, the request processing engine 208 can increase the latency in providing a response to the requests from users 218 of the computing service 202 and the digital certificate 212. The latency in providing the response and the digital certificate 212 may be negligible to the users 218 receiving the response and the digital certificate 212 but may be detectable by an administrator of the computing service 202 or an alarming system of the computing service 202. For example, the configuration information 206 may cause the request processing engine 208 to increase the latency in providing responses and the digital certificate 212 to users 218 by a particular amount that the administrator or an alarming system is able to identify via the request logs 214 generated by the request processing engine 208. An administrator or alarming system evaluating the request logs 214 may determine the average latency in providing responses to user requests prior to the certificate installation agent 204 detecting that the digital certificate 212 is to expire. If the average latency in providing the responses increases by a particular amount specified in the configuration information 206, the administrator or alarming system may determine that the digital certificate 212 is set to expire and perform one or more remedial operations to address the expiring digital certificate.

The request processing engine 208 may generate, in response to requests from users 218 to access the computing service 202, request logs 214 that may specify the parameters of these requests, including timestamps for when the requests were received, identifiers for users submitting the requests to the computing service 202, a determination as to whether a request was fulfilled, an identifier corresponding to the digital certificate 212 provided to the users 218, latency in providing the response to the requests and the digital certificate 212, and the like. The request processing engine 208 may store the request logs 214 in a request log data store 216, which may include one or more computer systems, servers, and storage devices of the computing service 202 that may be used to store request logs 214 corresponding to particular servers of the computing service 202 or to particular digital certificates provided by the computing service 202 to users 218. An administrator or alarming system of the computing service 202 may access the request log data store 216 at any time to evaluate the request logs 214 generated by the request processing engine 208 to evaluate the performance of the servers of the computing service 202 and to identify any abnormal issues regarding performance of the servers of the computing service 202.

In some embodiments, as the digital certificate 212 draws closer to expiration, the configuration information 206 will cause the request processing engine 208 to increase the latency in responding to user requests and in providing the digital certificate 212. Thus, the request logs 214 may illustrate an increasing latency over time as the digital certificate 212 draws closer to expiration. This may make it more likely for an administrator or alarming system to detect that the digital certificate 212 is set to expire. Further, as the latency is increased, users 218 may transmit more notifications to the administrator of the computing service 202 to indicate that the users 218 are being impacted by the additional latency. This may serve as an indication that remedial actions are to be performed to address the expiring digital certificate, such as issuing a new digital certificate or renewing the existing digital certificate. In addition to increasing the latency in responding to user requests, the configuration information 206 may cause the request processing engine 208 or the certificate installation agent 204 to modify the request logs 214 or generate new request logs to indicate that the digital certificate 212 is set to expire, as described above in connection with FIG. 1.

Figure 3:
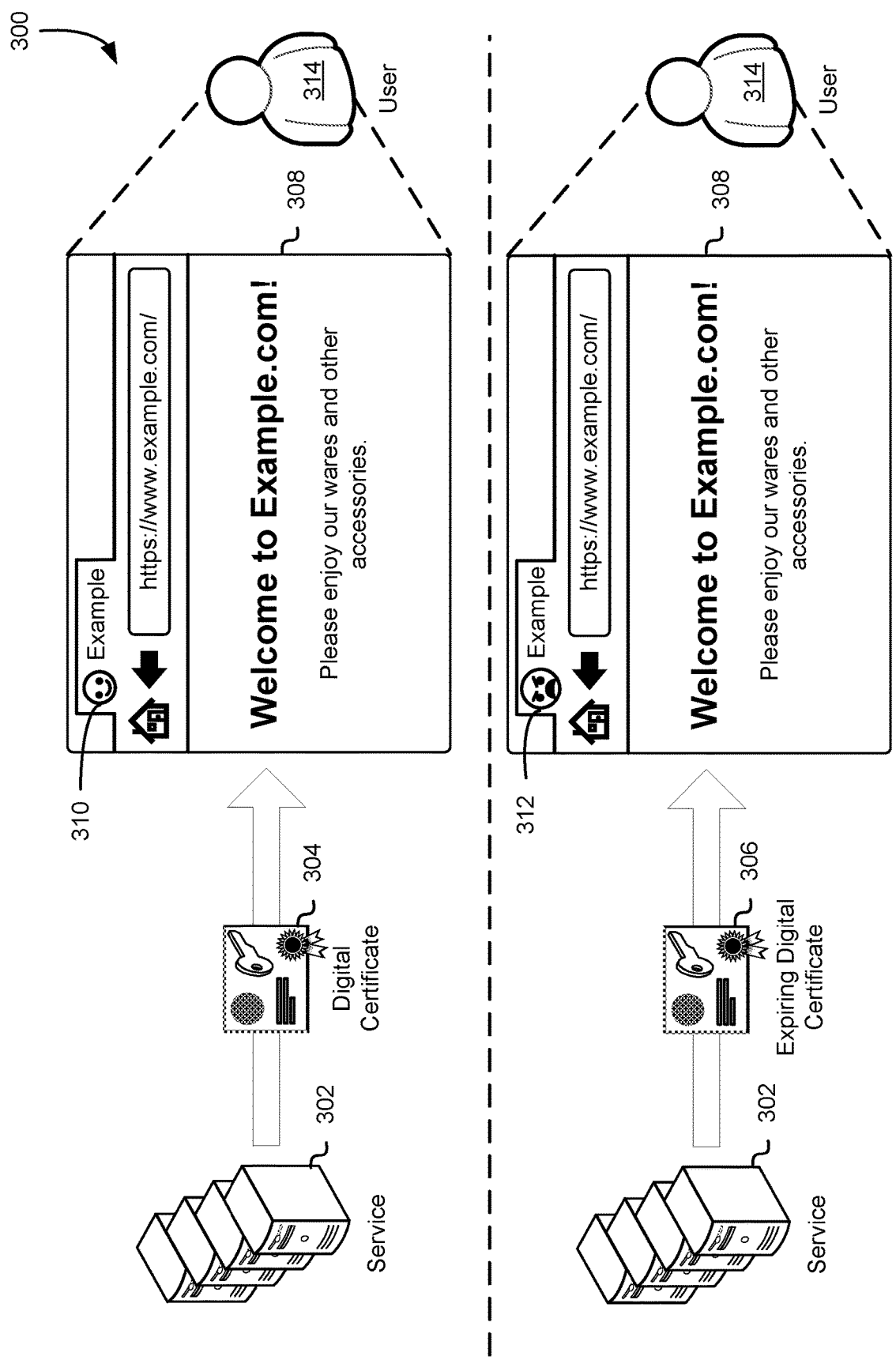
FIG. 3 shows an illustrative example of an environment in which a computing service transmits data to a client to cause the client to display a negative favicon to a user of the client in response to an indication that the digital certificate is set to expire in accordance with at least one embodiment.

In addition to modifying request logs to indicate that a digital certificate is set to expire or gradually increasing the latency for responding to user requests to access the computing service and obtain the digital certificate, the computing service may transmit data to the client device of the user to cause the client device to display a negative favicon to the user. The negative favicon may be different from a favicon that is displayed on the client device using data from the computing service. This negative favicon may serve as an indication that the digital certificate is set to expire within a particular time range as specified in the configuration information. Accordingly, FIG. 3 shows an illustrative example of an environment 300 in which a computing service 302 transmits data to a client to cause the client to display a negative favicon 312 to a user 314 of the client in response to an indication that the digital certificate 304 is set to expire in accordance with at least one embodiment.

In the environment 300, in response to requests from users 314 to access resources of the computing service 302, the computing service 302 may transmit data that may be used by a user client to render a graphical user interface (GUI) 308 for interacting with the computing service 302. The GUI 308 may include a web page displayed via a browser application installed on a user client device. In an embodiment, the data provided to the user client in response to a request from a user 314 includes one or more image files for rendering a favicon 310 onto one or more elements of the browser application, such as a browser window tab. The favicon 310 may include an iconic representation of a logo utilized by the computing service 302 that is unique to the computing service 302. This favicon 310 may be used to illustrate that the web page rendered in the browser application is provided by the computing service 302 to enable the user 314 to interact with the web page and, thus, the computing service 302. In an embodiment, the certificate installation agent or the request processing engine of the computing service 302 evaluates the digital certificate 304 to determine whether the digital certificate 304 is set to expire within a time range specified in the configuration information provided by an administrator of the computing service 302 or a computing service provider. If the certificate installation agent or the request processing engine determine that the digital certificate 304 is not set to expire within the time range specified in the configuration information, the computing service 302 may fulfill incoming requests from a user 314 by providing the data used to render a web page via a browser application and the favicon 310 used by the computing service 302. In some instances, the computing service 302 may provide data used to render the favicon 310 that includes a cache control header. This cache control header may provide an indication to the user's computing device as to when to submit a request to obtain data for rendering the favicon 310. The cache control header may be set to a short period of time in order to increase the likelihood of the user's computing device requesting data for rendering a negative favicon 312 if the digital certificate 304 is set to expire, as explained in greater detail below.

In an embodiment, if the certificate installation agent or the request processing engine of the computing service 302 determines that the digital certificate is set to expire within the time range specified in the configuration information, the certificate installation agent or the request processing engine will cause the computing service 302 to provide the expiring digital certificate 306, as well as data that causes the client device of a user 314 to render a negative favicon 312 via the browser application. The negative favicon 312 may include one or more images that differ from the favicon 310 presented if the digital certificate 304 is not to expire within the time range specified in the configuration information. For instance, the negative favicon 312 may include one or more unique images that represent an issue with the digital certificate provided by the computing service 302. As an illustrative example, the negative favicon 312 may represent a negative emotion, such as anger or sadness, which may be representative of an issue. Additionally, or alternatively, the negative favicon 312 may be rendered using colors associated with potential issues, such as red and black. The negative favicon 312 may also include certain characters that may indicate potential issues, including question marks, exclamation points, or any other character that may be recognizable by a user 314 as being indicative of an issue with the web page.

The presentation of a negative favicon 312 may cause a client device of a user 314 to transmit a notification to the computing service 302 to indicate that a different favicon has been produced using the data provided by the computing service 302. For instance, if the client device has cached previous data obtained from the computing service 302 corresponding to the favicon, the client device may compare this data with the data received in response to a new request from the user 314 to access the computing service 302. If the data corresponding to the favicon differs, the client device may determine that there is an inconsistency in the favicon data and submit a notification to the computing service 302. The computing service 302 may log such notifications in the request logs described above. Thus, an administrator or alarming system may evaluate these request logs to determine that a negative favicon 312 is being rendered by users 314, which may cause the administrator or alarming system to determine that the digital certificate is set to expire within the time range specified in the configuration information.

In some embodiments, if the computing service 302 determines that the digital certificate is set to expire within the time range specified in the configuration information, the computing service 302 will determine whether the request to access the computing service 302 was submitted by an administrator of the computing service 302 or other entity authorized by the administrator to evaluate the performance of the computing service 302. For instance, the computing service 302 may maintain the network addresses, such as Internet Protocol (IP) addresses, of administrators of the computing service 302 and other entities tasked with evaluating the performance of the computing service 302. If the computing service 302 determines that the request originated from a computer system having any of the specified network addresses, the computing service 302 may provide the expiring digital certificate 306 along with data that, as a result of being processed by a client device of the requestor, causes the client device to render the negative favicon 312 via the browser application. The negative favicon 312 may serve as an indication to the administrator or to other entities tasked with evaluating the performance of the computing service 302 that the digital certificate is set to expire within the time range specified in the configuration information. However, if the network address of the user 314 does not correspond to any of the specified network addresses corresponding to administrators of the computing service 302 or other entities tasked with evaluating the performance of the computing service 302, the computing service 302 may provide the expiring digital certificate 306 to the user 314, along with data that, as a result of being processed by a client device of the user 314, causes the client device to render the ordinary favicon 310 via the browser application.

In some embodiments, the data provided by the computing service 302 includes executable instructions or programmatic code (e.g., JavaScript, etc.) that causes the client device of the requestor to transmit a notification to the computing service 302 that specifies the favicon presented by the client device. For instance, the client device may utilize the data provided by the computing service 302 to render the negative favicon 312 via the browser application and, via execution of the instructions, generate a notification that specifies that the negative favicon 312 was rendered. The client device may transmit this notification to a particular network endpoint specified in the data provided by the computing service 302 (e.g., a certificate monitoring service, a server of the computing service 302, etc.) or to the computing service 302 itself. The computing service 302 may evaluate the notification to determine whether the negative favicon 312 was rendered and, if so, may update one or more request logs to indicate that the digital certificate is set to expire. The computing service 302 may also artificially indicate a degradation of a server that provides the digital certificate, which may serve as an indication that the digital certificate is set to expire. For example, in some embodiments, an artificial indication is information that indicates the server is performing in one or more ways worse than it is actually performing.

Figure 4:
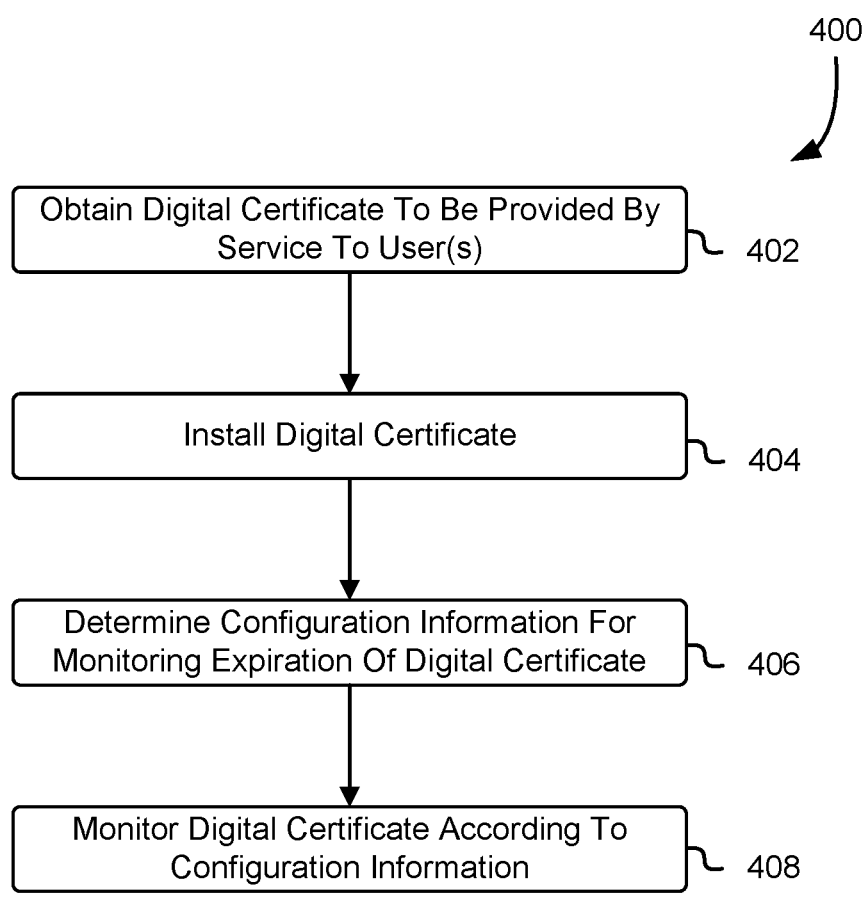
FIG. 4 shows an illustrative example of a process for monitoring a digital certificate, based at least in part on configuration information, to determine whether the digital certificate is set to expire in accordance with at least one embodiment.

As noted above, a computing service may include a certificate installation agent that obtains a digital certificate from a certificate authority and installs the digital certificate onto a server of the computing service as the server is being initialized for processing requests to access the computing service. The computing service or other entity associated with the computing service (e.g., administrator of the computing service, a computing service provider, etc.) may provide the certificate installation agent with configuration information that includes preferences for monitoring the digital certificate to determine whether the digital certificate is expiring. The certificate installation agent may perform a set of operations if the digital certificate is set to expire and may cause a request processing engine of the computing service to perform other operations to demonstrate that the digital certificate is set to expire. Accordingly, FIG. 4 shows an illustrative example of a process 400 for monitoring a digital certificate, based at least in part on configuration information, to determine whether the digital certificate is set to expire in accordance with at least one embodiment. The process 400 may be performed by the aforementioned certificate installation agent, which may obtain the configuration information from the computing service or from another entity associated with the computing service and use the configuration information to determine the techniques for monitoring the digital certificate.

In an embodiment, the computing service will launch a certificate installation agent on a server that is being initialized for use in processing requests from users to access the computing service. The certificate installation agent may be responsible for installing a digital certificate on to the server such that, in response to requests from users of the computing service, the server may provide the digital certificate to these users. The digital certificate may enable these users to authenticate the computing service, as well as decrypt any encrypted data provided by the server to the users as fulfillment of the requests from the users and as part of a process for establishing a secure communications channel with these users. The certificate installation agent may submit a digital certificate signing request to a certificate authority to obtain 402 the digital certificate that is to be provided by the computing service to its users. The digital certificate signing request may specify a public cryptographic key for the computing service, which may be part of a cryptographic key pair generated by the computing service. The request may also include parameters that indicate parameters to be included in the digital certificate such as a subject that corresponds to the computing service and a validity period for the digital certificate. The certificate installation agent may transmit the digital certificate signing request to a certificate authority that may be trusted by both the computing service and users of the computing service. In some instances, rather than submitting a digital certificate signing request, the certificate installation agent may obtain the digital certificate from an administrator of the computing service or from another entity, such as a computing service provider or other server of the computing service.

In response to obtaining the digital certificate, the certificate installation agent may install 404 the digital certificate on to the server. For instance, the certificate installation agent may store the digital certificate in a certificate data store accessible by the server. Additionally, the certificate installation agent may transmit information to a request processing engine of the server to indicate the storage location of the digital certificate and an identifier for the digital certificate that can be used to locate the digital certificate at the storage location.

In addition to installing the digital certificate for use by the server, the certificate installation agent may determine 406 the configuration information for monitoring the expiration of the digital certificate. For instance, the certificate installation agent may obtain the configuration information for monitoring of the digital certificate from an administrator of the computing service or other entity associated with the computing service that has authority to configure the one or more servers and applications provided by the computing service. The configuration information may specify a time range during which the digital certificate may be considered to be set to expire. The configuration information may also specify one or more operations to be performed by the certificate installation agent or by the request processing engine if the digital certificate is set to expire. For instance, if the digital certificate is set to expire, the certificate installation agent may provide the configuration information to the request processing engine, which may perform the one or more operations specified therein. As an example, the request processing engine may cause a server of the service to utilize additional random access memory (RAM), processing power, or any other computing resource to increase the latency in performing any operations or otherwise cause measurements indicative of abnormal (e.g., degraded) performance to be logged or otherwise recorded. This may be logged, for instance, by the request processing engine. The certificate installation agent may thus monitor 408 the digital certificate according to the configuration information in order to determine if the digital certificate is set to expire and, if so, perform the operations specified therein along with the request processing engine of the server.

Figure 5:
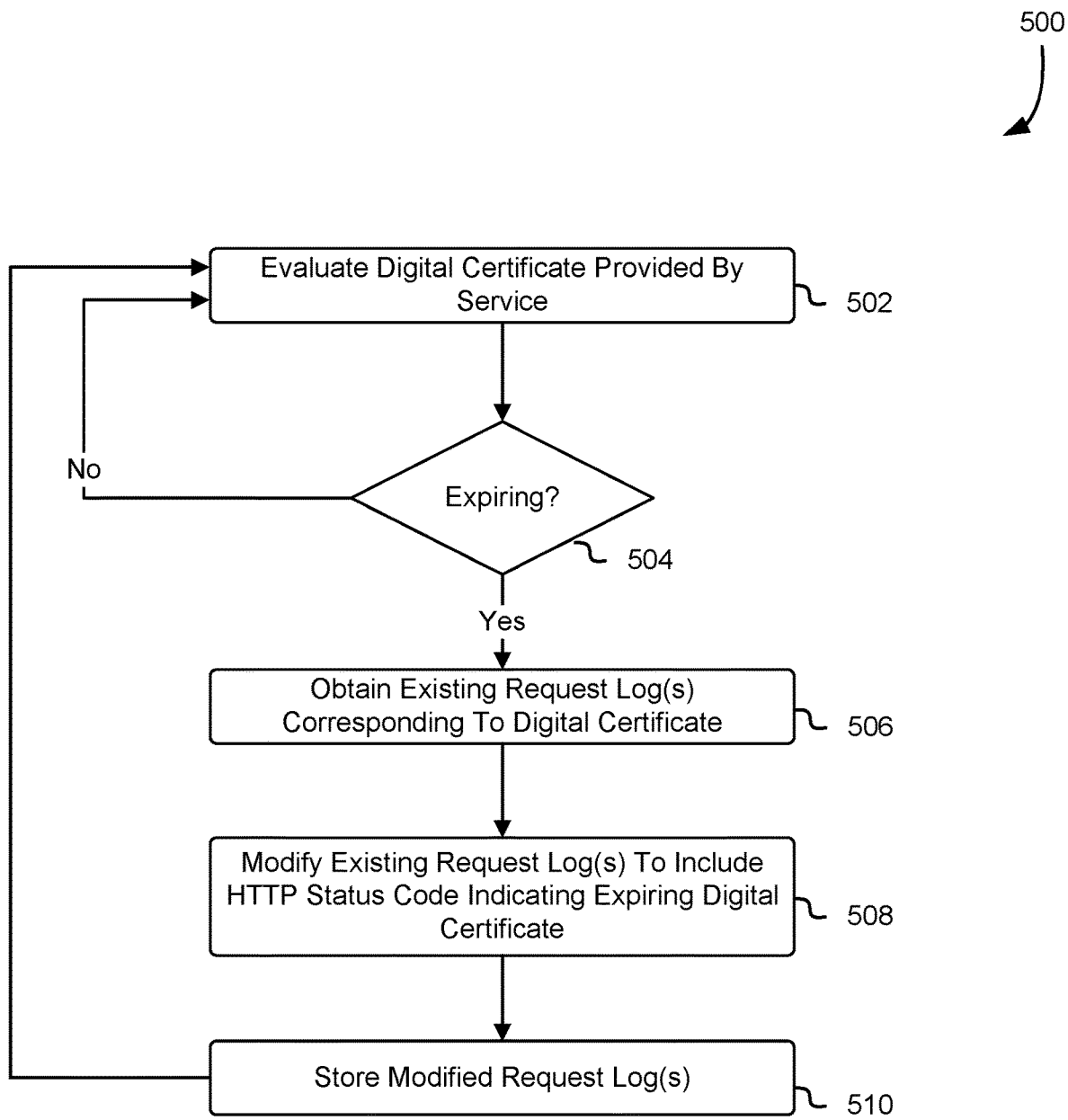
FIG. 5 shows an illustrative example of a process for updating one or more request logs to specify HTTP status codes indicating that a digital certificate is set to expire in response to a determination that the digital certificate is set to expire in accordance with at least one embodiment.

As noted above, the certificate installation agent may periodically or in response to a triggering event evaluate a digital certificate provided by a server of the computing service to determine if the digital certificate is set to expire. If the digital certificate is set to expire, the certificate installation service may cause a request processing engine of the server to modify existing request logs maintained by the server to include one or more HTTP status codes indicating upcoming expiration of the digital certificate. These modified request logs may be stored in a request log data store maintained by the computing service, where an administrator of the computing service or other entity tasked with monitoring performance of the servers of the computing service may obtain the request logs and identify the HTTP status codes in the request logs. This may cause the administrator or other entity to determine that the digital certificate is set to expire and to perform one or more remedial operations to address the impending expiration of the digital certificate. Accordingly, FIG. 5 shows an illustrative example of a process 500 for updating one or more request logs to specify HTTP status codes indicating that a digital certificate is set to expire in response to a determination that the digital certificate is set to expire in accordance with at least one embodiment. The process 500 may be performed by the aforementioned certificate installation agent in conjunction with the request processing engine of the server that provides the digital certificate in response to user requests made to the computing service.

Based at least in part on the configuration information obtained by the certificate installation agent, the certificate installation agent may evaluate 502 the digital certificate provided by the computing service through a server to determine 504 if the digital certificate is set to expire. As described above, the configuration information may specify a time range during which the digital certificate may be considered to be set to expire. If the certificate installation agent determines that the digital certificate is not within this time range and, thus, is not set to expire, the certificate installation agent may continue to monitor the digital certificate according to the configuration information. The certificate installation agent evaluate the digital certificate periodically (e.g., every minute, every hour, every twelve hours, every day, etc.) to determine whether the digital certificate is set to expire. Alternatively, the certificate installation agent may evaluate the digital certificate in response to a triggering event, such as in response to receiving an indication from a certificate authority that the digital certificate is set to expire.

If the certificate installation agent determines that the digital certificate is set to expire, the certificate installation agent may transmit configuration information to the request processing engine to cause the request processing engine to obtain 506 one or more existing request logs corresponding to the digital certificate. The request logs may specify details regarding requests received by the request processing engine and regarding fulfillment of these requests. The information specified in the request logs may include a timestamp corresponding a time at which a request was received, the operations performed in response to the request, whether the request was fulfilled or denied, an identifier for the digital certificate provided in response to the request, and the like. The request processing engine may obtain the request logs from a request log data store maintained by the computing service, which may be used to maintain request logs from each server of the computing service that process incoming user requests.

Once the request processing engine has obtained the one or more existing request logs from the request log data store, the request processing engine may modify 508 the existing request logs to include one or more HTTP status codes that are indicative of an expiring digital certificate. For instance, based at least in part on the configuration information, the request processing engine may append the existing request logs to indicate one or more entries indicating an HTTP status code that may denote that a digital certificate is set to expire. The HTTP status code may include an error code along with a description of the nature of the error, namely, that the digital certificate is set to expire. The information included in the entry may include the expiration date of the digital certificate, as well as the time remaining before the digital certificate expires. In some embodiments, the request processing engine will append the request logs with the HTTP status codes in a manner that makes these entries distinctive from other entries specified in the request logs. This may include changing the font size, font face, or color of the entries to make these entries more easily recognizable upon inspection. In an embodiment, the request processing engine generates one or more new request logs that include the HTTP status codes that are used to indicate that a digital certificate is set to expire. Thus, an administrator evaluating these newly created request logs may determine that the digital certificate is set to expire without having to review additional entries corresponding to requests processed by the request processing engine. It should be noted that while HTTP error codes are used extensively throughout the present disclosure for the purpose of illustration, other codes or entries may be included in the one or more request logs. For instance, instead of an HTTP error code, the certificate installation agent may generate one or more entries in a request log that indicates that the digital certificate is to expire, as well as operations that may be performed to mitigate the impact of the expiring digital certificate.

The request processing engine may store 510 the modified or newly created request logs in the request log data store to enable an administrator or other entity authorized to monitor performance of the computing service to obtain the request logs and determine that the digital certificate is set to expire. The certificate installation agent may continue to evaluate 502 the digital certificate provided by the computing service and may cause the request processing engine to continue to provide the HTTP status code entries in the request logs if no remedial actions are taken to address the expiring digital certificate. In some embodiments, as the digital certificate draws closer to expiration, the request processing engine may increase the frequency of HTTP status code entries specified in the existing request logs. This may serve as an increase in the urgency for an administrator other entity authorized to monitor performance of the computing service to perform remedial operations to address the expiring digital certificate.

Figure 6:
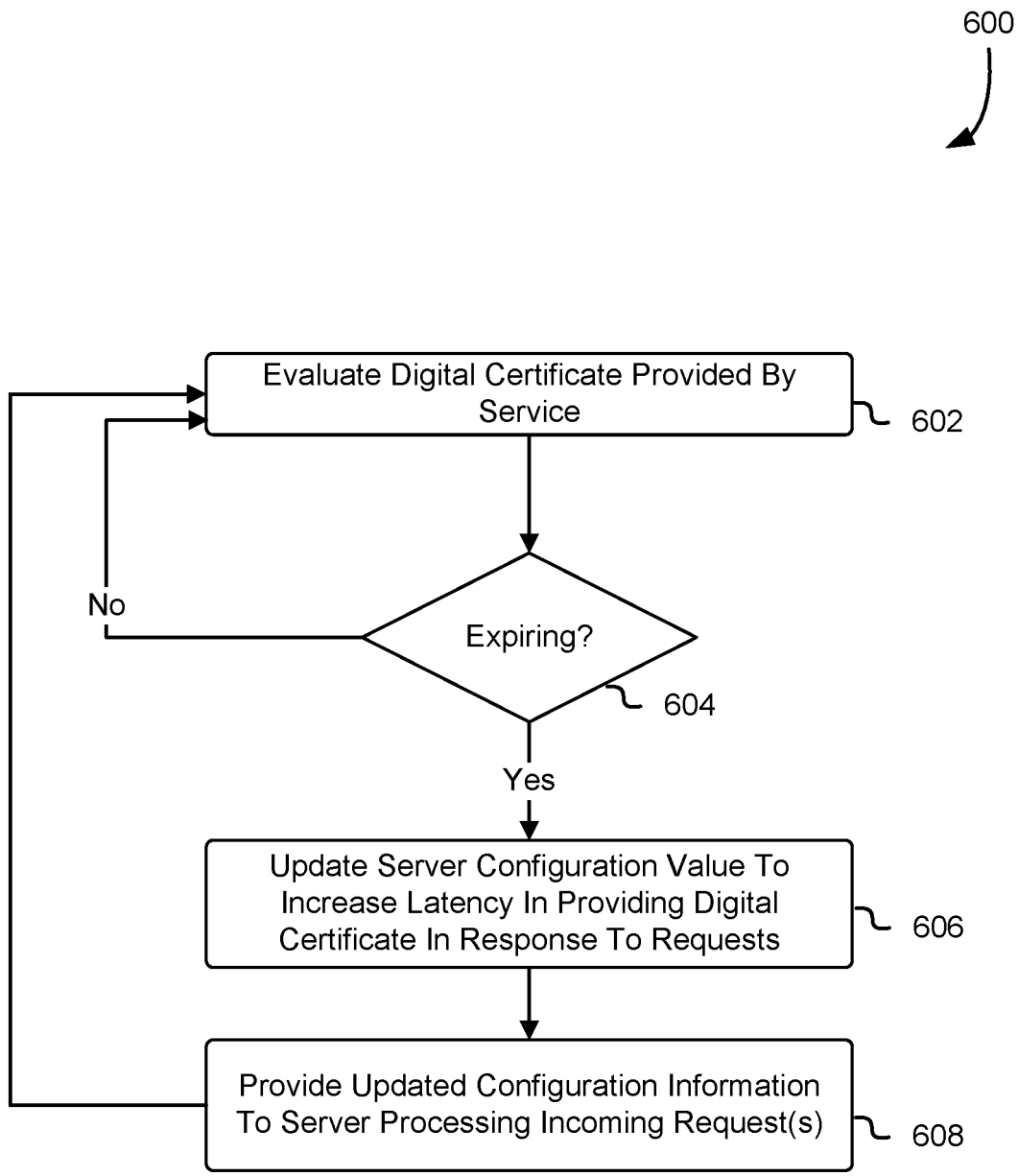
FIG. 6 shows an illustrative example of a process for updating a server configuration value to cause the server to randomly increase the latency in providing a digital certificate in response to client requests if the digital certificate is set to expire in accordance with at least one embodiment.

As noted above, if the certificate installation agent determines that a digital certificate is set to expire, the certificate installation agent may transmit configuration information to the request processing engine to update a server configuration value that may cause the request processing engine to increase the latency in providing the digital certificate to users. This additional latency may be recorded in the request logs maintained by the request processing engine, which may serve as an indication to an administrator or other entity authorized to monitor performance of the computing service that the digital certificate is set to expire. Accordingly, FIG. 6 shows an illustrative example of a process 600 for updating a server configuration value to cause the server to randomly increase the latency in providing a digital certificate in response to client requests if the digital certificate is set to expire in accordance with at least one embodiment. The process 600 may be performed by the aforementioned certificate installation agent, which may update the configuration of a server configured to provide the digital certificate in response to requests to cause the server to increase the latency in providing the digital certificate.

Similar to the process 500 described above in connection with FIG. 5, the certificate installation agent may evaluate 602 the digital certificate provided by the computing service through a server to determine 604 if the digital certificate is set to expire. If the certificate installation agent determines that the digital certificate is not set to expire, the certificate installation agent may continue to monitor the digital certificate according to the configuration information.

If the certificate installation agent determines that the digital certificate is set to expire, the certificate installation agent may update 606 a server configuration value for the server providing the digital certificate in response to user requests to increase the latency in providing the digital certificate. In an embodiment, the certificate installation agent may update the server configuration value to a value specified in the configuration information provided by an administrator or other entity authorized to monitor performance of the computing service. This value may correspond to a minimal increase to the latency in responding to user requests such that the additional latency is undetectable by users of the computing service but is detectable by an administrator of the computing service via the request logs maintained by the request processing engine.

In addition to updating the server configuration value to increase the latency in providing the digital certificate to users of the computing service, the certificate installation agent may provide 608 the updated configuration information for the server to the server processing incoming requests to the computing service. The configuration information may cause the request processing engine to implement the updated server configuration value corresponding to the additional latency to be introduced. Additionally, the configuration information may cause the request processing engine to implement the additional latency in different ways. For example, in an embodiment, the configuration information specifies a frequency at which the additional latency is to be applied to incoming requests. For instance, the configuration information may cause the request processing engine to add latency to the response to each nth request received by the request processing engine, where n may be defined in the configuration information. Alternatively, the configuration information may cause the request processing engine to randomly add latency in responding to requests.

Once the certificate installation agent has provided the updated configuration information to the request processing engine, the certificate installation agent may continue to evaluate the digital certificate to determine whether it is expiring. In an embodiment, if the certificate installation agent determines that the digital certificate is drawing closer to expiration, the certificate installation agent may update the server configuration value to a new value to increase the latency in providing the digital certificate. Thus, as the digital certificate draws closer to expiration, the latency may be continuously increased. This latency may be specified in the request logs such that, as the latency increases, additional urgency is introduced for performing remedial tasks to address the expiring digital certificate.

Figure 7:
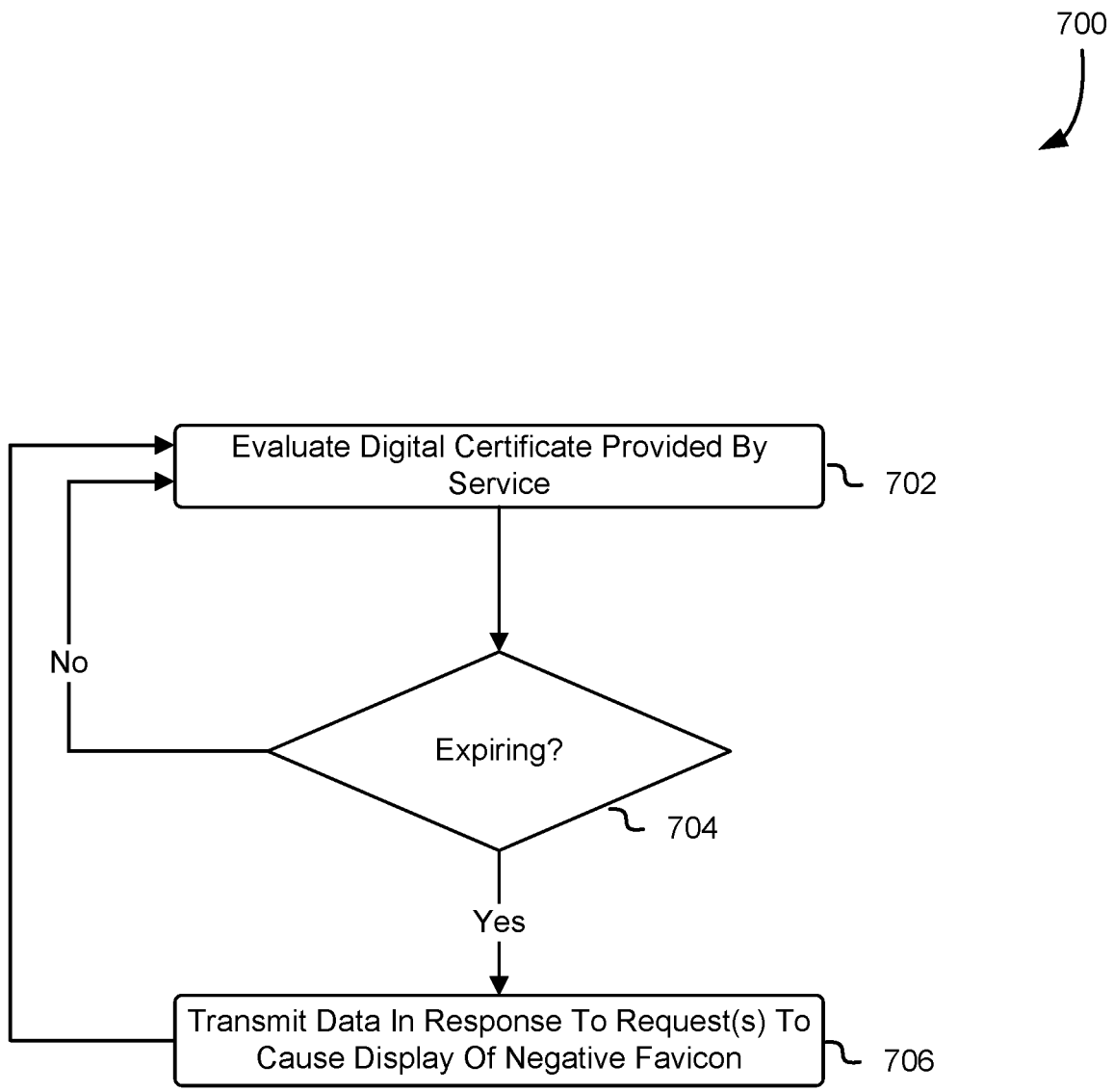
FIG. 7 shows an illustrative example of a process for providing data that causes a client to display a negative favicon that serves as an indication that a digital certificate is set to expire if the digital certificate is set to expire in accordance with at least one embodiment.

As noted above, if a certificate installation agent determines that a digital certificate is set to expire, the certificate installation agent may cause the request processing engine of a computing service server to provide data in response to a request to cause a user client to display a negative favicon that may serve as an indication that the digital certificate is set to expire. This may cause the user to notify the computing service of the negative favicon, thereby resulting in a notification to the computing service that the digital certificate is set to expire. Accordingly, FIG. 7 shows an illustrative example of a process 700 for providing data that causes a client to display a negative favicon that serves as an indication that a digital certificate is set to expire if the digital certificate is set to expire in accordance with at least one embodiment. The process 700 may be performed by the aforementioned certificate installation agent in conjunction with the request processing engine of a server of the computing service. The certificate installation agent may provide configuration information to the request processing engine to perform some of the operations specified in the process 700.

Similar to the processes 500 and 600 described above in connection with FIGS. 5 and 6, respectively, the certificate installation agent may evaluate 702 the digital certificate provided by the computing service through a server to determine 704 if the digital certificate is set to expire. If the certificate installation agent determines that the digital certificate is not set to expire, the certificate installation agent may continue to monitor the digital certificate according to the configuration information. Further, the request processing engine may continue to provide data to users submitting requests to the computing service to cause clients of these users to display a favicon typically associated with the computing service.

If the certificate installation agent determines that the digital certificate is set to expire, the certificate installation agent may transmit configuration information to the request processing engine to cause the request processing engine to transmit 706 data in response to user requests to cause clients of these users to display a negative favicon. The negative favicon may include one or more images that differ from the favicon presented if the digital certificate is not to expire within the time range specified in the configuration information. For instance, the negative favicon may include one or more unique images that represent an issue with the digital certificate provided by the computing service. As an illustrative example, the negative favicon may represent a negative emotion, such as anger or sadness, which may be representative of an issue. Additionally, or alternatively, the negative favicon may be rendered using colors associated with potential issues, such as red and black. The negative favicon may also include certain characters that may indicate potential issues, including question marks, exclamation points, or any other character that may be recognizable by a user as being indicative of an issue with the web page.

The presentation of a negative favicon may cause a client device of a user to transmit a notification to the computing service to indicate that a different favicon has been produced using the data provided by the computing service. For instance, if the client device has cached previous data obtained from the computing service corresponding to the favicon, the client device may compare this data with the data received in response to a new request from the user to access the computing service. If the data corresponding to the favicon differs, the client device may determine that there is an inconsistency in the favicon data and submit a notification to the computing service. The computing service may log such notifications in the request logs described above, which may be used to determine that the digital certificate is set to expire.

Figure 8:
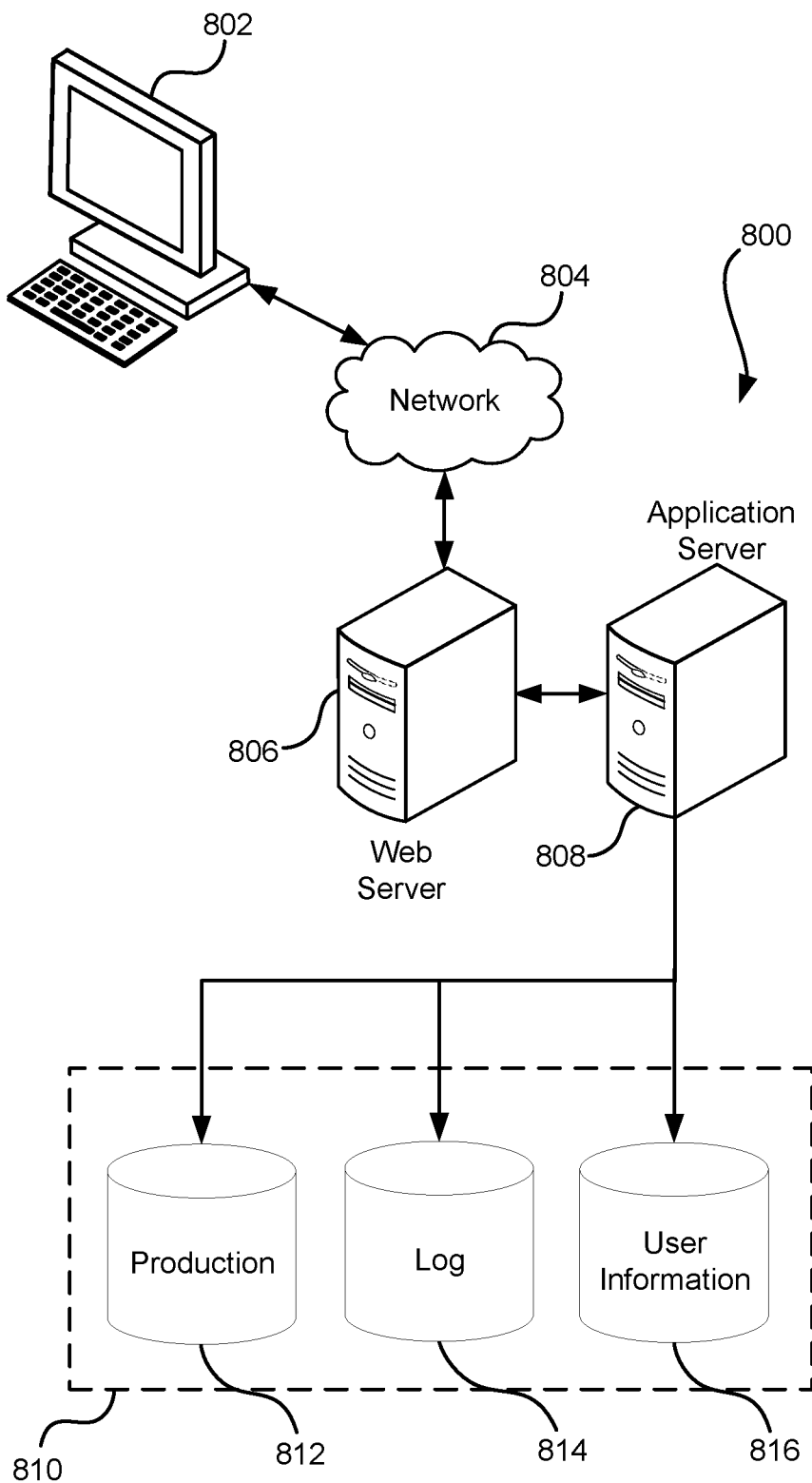
FIG. 8 shows an illustrative example of an environment in which various embodiments can be implemented.

FIG. 8 illustrates aspects of an example system in the environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 802 and the application server 808, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes, and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update, or otherwise process data in response thereto. The application server 808 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system in the environment 800 in FIG. 8 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIF S"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java C, C#, or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining, from a client, a request to interact with a server of a computing service;
    determining that a digital certificate usable by the client to authenticate the server is due to expire within a threshold amount of time;
    providing, in response to the request, the digital certificate to the client; and
    causing, by updating configuration information associated with the digital certificate, the server to provide data to the client that:
        causes the client to display a negative favicon into a browser window tab, the negative favicon indicating that the digital certificate provided is due to expire within the threshold amount of time; and
        causes the client to submit a notification to the computing service indicating an inconsistency between the data and information on the client about a previous favicon.

2. The computer-implemented method of claim 1, wherein the data comprises one or more image files.

3. The computer-implemented method of claim 1, wherein the threshold amount of time is specified in the configuration information.

4. The computer-implemented method of claim 1, wherein the data corresponding to the negative favicon differs from information on the client about a previous favicon, causing the client to submit a notification indicating an inconsistency to the computing service.

5. The computer-implemented method of claim 1, wherein the data comprises a cache control header.

6. The computer-implemented method of claim 5, wherein the cache control header provides an indication to the client as to when the client should submit a subsequent request to obtain additional data for rendering a favicon.

7. A system, comprising:
    one or more processors; and
    memory storing computer-executable instructions that, upon execution, cause the one or more processors to:
        determine, based at least in part on a response from a server to a client request to the server, that a digital certificate of the server will expire within a threshold amount of time; and
        as a result of determining that the digital certificate will expire, update configuration information on the server thereby causing the server to provide data to a client associated with the client request that:
            causes the client to display a favicon in an interface window tab that serves as an indication that the digital certificate is set to expire within a particular time range as specified in the configuration information; and
            causes the client to notify the computing service of a difference between the data and information on the client regarding a previous favicon.

8. The system of claim 7, wherein the favicon is a graphical representation that indicates an issue with the digital certificate.

9. The system of claim 7, wherein the favicon is rendered using a color associated with severity of a potential issue with the digital certificate.

10. The system of claim 7, wherein the favicon includes one or more characters that are indicative of an issue with a web page.

11. The system of claim 7, wherein the data comprises programmatic code that causes the client to transmit a notification, to a computing service, that the favicon was presented by the client.

12. The system of claim 7, wherein the data is provided based at least in part on an Internet Protocol (IP) address contained within the client request to the server.

13. The system of claim 7, wherein the data comprises one or more image files.

14. The system of claim 7, wherein the data comprises a cache control header.

15. A non-transitory computer-readable storage medium comprising executable instructions that, upon execution by one or more processors of a computer system, cause the computer system to at least:
    obtain a response from a server to a request from a client;
    determine, at least in part as a result of an evaluation of the response, that a digital certificate of the server will expire within a threshold amount of time; and
    as a result of determining that the digital certificate will expire, cause the server to provide data to the client that:
        causes the client to display a favicon in a browser interface outside of a viewing window of the browser; and
        causes notification of the computing service of a relationship between the data and information regarding a second favicon.

16. The non-transitory computer-readable storage medium of claim 15, wherein the data comprises one or more image files.

17. The non-transitory computer-readable storage medium of claim 15, wherein the data further causes the client to render the favicon in a web page.

18. The non-transitory computer-readable storage medium of claim 15, wherein the data further causes the client to provide a notification to the server.

19. The non-transitory computer-readable storage medium of claim 15, wherein the data is based at least in part on an Internet Protocol (IP) address included with the request.

20. The non-transitory computer-readable storage medium of claim 19, wherein the IP address contained within the request indicates that the request is from an administrator.

* * * * *